Figure 1:
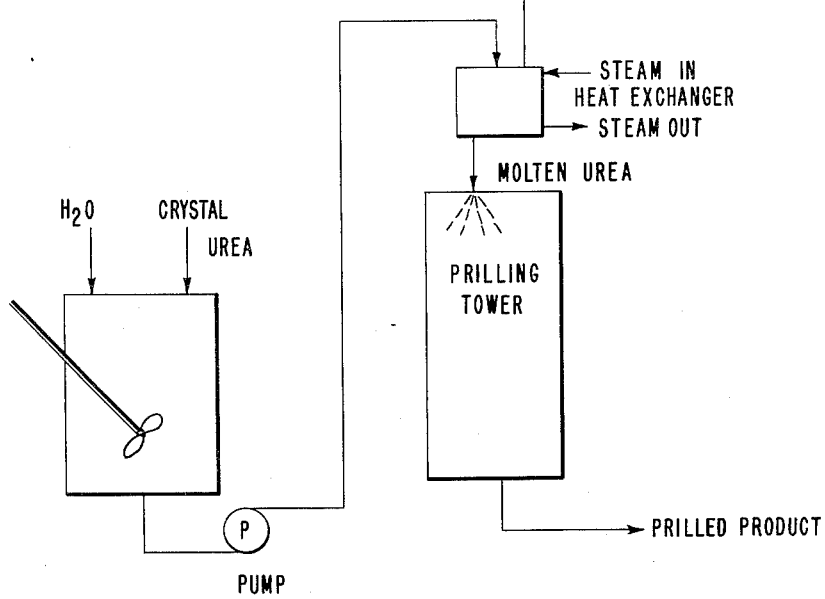

March 20, 1962  J. E. BEECHER ET AL  3,025,571
PROCESS FOR PRODUCING PRILLED UREA
OF LOW BIURET CONTENT
Filed Jan. 29, 1960

INVENTORS
JACK E. BEECHER
ROBERT J. KALLAL
CLIFFORD M. SAYRE, JR
ISAAC M. SINGER, JR
BY Albert B. Griggs ATTORNEY

United States Patent Office 3,025,571
Patented Mar. 20, 1962

3,025,571
PROCESS FOR PRODUCING PRILLED UREA OF LOW BIURET CONTENT
Jack E. Beecher, South Charleston, and Robert J. Kallal, Clifford M. Sayre, Jr., and Isaac M. Singer, Jr., Charleston, W. Va., assignors to E. I. du Pont de Nemours and Company, Wilmington, Del., a corporation of Delaware
Filed Jan. 29, 1960, Ser. No. 5,411
5 Claims. (Cl. 18—47.2)

This invention relates to prilled urea. It is more particularly directed to processes for the production of prilled urea of low biuret content by heating crystal urea of low biuret content in water to remove the water and simultaneously produce molten urea which can thereafter be prilled to produce a product of low biuret content.

In the drawings—

Figure 2:
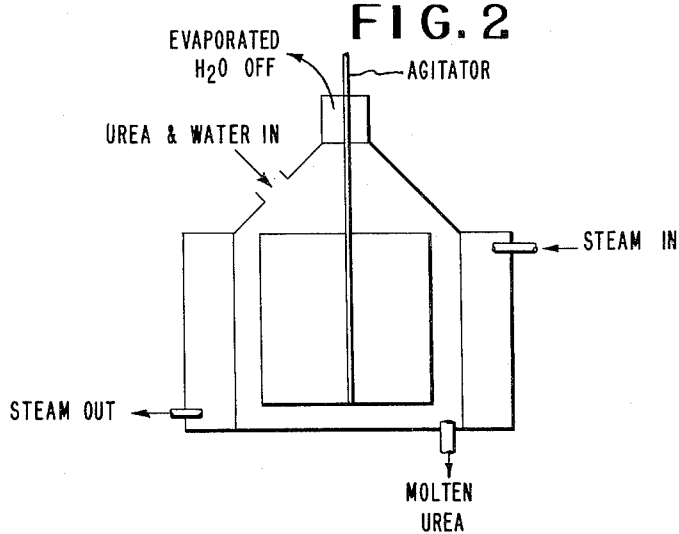

FIGURE 1 is a semi-diagrammatic representation of apparatus suitable for carrying out preferred processes of the invention, and FIGURE 2 illustrates a preferred type of heat exchanger for use in the process of FIGURE 1.

Prilled urea is customarily produced by heating the water-urea product produced by reaction of ammonia and carbon dioxide to remove the water and to obtain molten urea and the molten urea is then prilled by spraying into cool gases. The urea thus prilled is of comparatively high biuret content, running ordinarily about 0.7% to 2.5% by weight.

Urea of higher purity and low biuret content is obtained by crystallizing the urea from water but when crystal urea thus obtained is melted in customary manner prior to prilling, the biuret content rises rapidly.

Now we have found that if water is added to crystal urea of low biuret content purity to make a solution or slurry this can then be heated to simultaneously remove the water and produce molten urea which can be prilled to make a product of low biuret content.

The crystal urea starting material employed according to the invention will contain from about 0.05 to 0.50% of biuret based upon the weight of the urea crystal.

This product can then be dissolved in water using water in the amount of 10 to 20% by weight of the urea. Generally it will be satisfactory to use a saturated solution or nearly saturated solution at the planned temperature of operation. There is, of course, no great advantage to having any excess of water because it must later be removed.

A preferred practice of the invention is to produce a slurry by using an excess of urea over that soluble in the water employed. Thus, a slurry can be made using an excess of urea over that soluble such that there is 30% by weight of undissolved urea in the total slurry. Somewhat more or less can be used. Thus, one might have any excess over saturation up to the point where the slurry becomes difficult to handle, say 45 or 50% excess.

According to the present invention the slurry or solution can be prepared as shown in the drawing in a suitable mixing tank. The mixture can then be pumped to a heat exchanger which will at once heat and vaporize the water and allow its removal while producing molten urea. The temperature should be maintained as close to the melting point of urea as possible. This prevents excessive biuret formation. It is also important to use an equipment design which will minimize hold-up of the molten urea at any point and which will minimize the time during which the urea is heated.

The product produced can then pass as shown in the drawing from the heat exchanger to a conventional prilling tower. The molten urea is sprayed into a relatively cool gas, which can be air, in a conventional manner.

A preferred embodiment of the invention uses an agitated film heat exchanger of the type shown in FIGURE 2. Various devices of this sort are available. The one illustrated is typical. In the device shown in FIGURE 2 the slurry or solution is fed into the top and is heated by the jacket illustrated. The agitator which operates at a comparatively high speed enhances heat transfer by maintaining a turbulent thin film on the walls of the heat exchanger. The molten product rapidly passes out at the bottom of the exchanger.

The prilled product obtained as described is of very low biuret content. Thus, in two preferred instances above described the products are obtained as follows:

| Crystal Urea, Percent Biuret | Solution Technique, Percent of Biuret in the Prilled Product | Slurry Technique Using 30% Excess of Urea, Percent of Biuret in Prilled Product |
|---|---|---|
| 0.05 | 0.35 | 0.25 |
| 0.50 | 0.80 | 0.70 |

In the above, the temperature of the internal wall is maintained as close to 135° C. as possible.

The urea should be held in a molten state as short a time as possible. In any event, it should not be kept molten more than one minute, and it is preferred that it be kept molten no more than 15 seconds before it is solidified as prills.

It is observed that if instead of using the techniques above, crystal urea is simply melted in a conventional heat exchanger and then prilled, the biuret content of the prilled product is 1 to 3% by weight, depending upon the exact conditions used.

We claim:

1. In a process for producing prilled urea of low biuret content, the steps comprising adding water to crystal urea, heating the crystal urea of low biuret content in water to remove the water and simultaneously produce molten urea and then prilling the molten urea.

2. In a process for producing prilled urea of low biuret content the steps comprising adding water to crystal urea containing 0.05 to 0.50% of biuret by weight, heating the crystal urea in water to remove the water and simultaneously produce molten urea and then prilling the molten urea.

3. In a process for producing prilled urea of low biuret content the steps comprising adding water to crystal urea of low biuret content, heating the crystal urea in water to remove the water and simultaneously produce molten urea and then prilling the molten urea.

4. In a process for producing prilled urea of low biuret content the steps comprising adding crystal urea of low biuret content to water to make a slurry, heating the slurry to remove the water and simultaneously produce molten urea and then prilling the molten urea.

5. In a process for producing prilled urea of low biuret content, the steps comprising making a slurry in water of crystal urea containing 0.05 to 0.50% of biuret by weight the said slurry containing an excess of urea over that soluble in the water up to as much as 50%, heating the slurry to remove the water and simultaneously produce molten urea and then prilling the molten urea.

References Cited in the file of this patent

UNITED STATES PATENTS

| 1,951,518 | Meiser | Mar. 20, 1934 |
| 2,267,133 | Porter | Dec. 23, 1941 |
| 2,933,526 | Guyer et al. | Apr. 19, 1960 |
| 2,933,527 | Guyer et al. | Apr. 19, 1960 |